US007852027B2

(12) United States Patent
Wu et al.

(10) Patent No.: US 7,852,027 B2
(45) Date of Patent: Dec. 14, 2010

(54) METHOD AND CIRCUIT FOR TESTING MOTOR

(75) Inventors: Li-Jian Wu, Shanghai (CN); Wan-Bing Jin, Shanghai (CN); Jian-Ping Yang, Shanghai (CN); Shih-Ming Huang, Taoyuan Shien (TW); Wen-Shi Huang, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 535 days.

(21) Appl. No.: 11/755,299

(22) Filed: May 30, 2007

(65) Prior Publication Data

US 2008/0018285 A1 Jan. 24, 2008

(30) Foreign Application Priority Data

Jun. 23, 2006 (TW) .............................. 95122839 A

(51) Int. Cl.
*H02P 6/18* (2006.01)

(52) U.S. Cl. .................. 318/400.34; 318/368; 318/459; 318/490; 318/805

(58) Field of Classification Search ................. 318/101, 318/135, 400.01, 400.06, 400.3, 400.31, 318/400.32, 400.33, 400.42, 490, 799, 628, 318/632, 638, 400.34, 159, 805, 368, 432, 318/437, 459; 73/609, 865.3, 865.9; 388/928.1; 327/200, 207.12, 239
See application file for complete search history.

(56) References Cited

U.S. PATENT DOCUMENTS

| | | | | |
|---|---|---|---|---|
| 4,422,040 | A * | 12/1983 | Raider et al. | 324/772 |
| 5,245,256 | A * | 9/1993 | Cassat et al. | 318/400.35 |
| 5,384,527 | A * | 1/1995 | Rozman et al. | 322/10 |
| 5,629,598 | A * | 5/1997 | Wilkerson | 318/808 |
| 5,811,946 | A * | 9/1998 | Mullin et al. | 388/811 |
| 5,920,174 | A * | 7/1999 | Kawada et al. | 318/663 |
| 5,962,947 | A * | 10/1999 | Suzuki et al. | 310/257 |
| 6,046,554 | A * | 4/2000 | Becerra | 318/400.34 |
| 6,762,575 | B2 * | 7/2004 | Douglas | 318/400.34 |
| 6,795,268 | B1 * | 9/2004 | Ryan | 360/78.04 |
| 6,995,530 | B2 * | 2/2006 | Biamonte et al. | 318/400.33 |
| 7,030,582 | B2 * | 4/2006 | Masino | 318/400.26 |
| 7,116,070 | B2 * | 10/2006 | MacKay | 318/400.11 |
| 7,138,776 | B1 * | 11/2006 | Gauthier et al. | 318/400.34 |
| 7,514,887 | B2 * | 4/2009 | Mullin et al. | 318/400.11 |
| 2007/0001636 | A1 * | 1/2007 | Murphree | 318/432 |

* cited by examiner

*Primary Examiner*—Walter Benson
*Assistant Examiner*—Antony M Paul
(74) *Attorney, Agent, or Firm*—Volpe and Koenig, P.C.

(57) ABSTRACT

A method for testing a motor having a rotor and a winding is provided. The method includes steps of (a) providing a power to rotate the rotor to a predetermined speed, (b) removing the power, (c) measuring a terminal voltage of the winding while a current within the winding is zero, (d) obtaining a back electromotive force in the winding by compensating the terminal voltage with a performance of the rotor, (e) selecting a characteristic of the back electromotive force and (f) determining a magnetization of the motor by comparing the characteristic with a predetermined parameter.

17 Claims, 15 Drawing Sheets

+5V R2 37 KST R1
ST
35
33 32 31
+
a
34
AD I/O
Vcc
36
AD I/O
– KM
b
TK
TK
KM

METHOD AND CIRCUIT FOR TESTING MOTOR

FIELD OF THE INVENTION

The present invention relates to a method and a circuit for testing a motor, and more particular to the method and circuit for testing the motor by checking and analyzing the back electromotive force of the motor.

BACKGROUND OF THE INVENTION

The operating property of the permanent magnet motor is determined by the magnetization property of the permanent magnet within the motor. A magnetic analyzer with a Hall sensor is usually used to check the qualified magnetization of the permanent magnet. Please refer to FIG. 1, which is a drawing showing that the magnetic analyzer is used to check the permanent magnet of the motor in the prior art. As shown in FIG. 1, the magnetic analyzer 11 including the probe 111 and Hall sensor 112 is used to check the permanent magnet. After the probe 111 goes round the rotor 12, the magnetic density of the permanent magnet's surface could be obtained.

Nevertheless, such a conventional equipment has at least the following disadvantages. (1) It is necessary to adjust the relative positions between the permanent magnet and probe many times during the checking process, and it takes lots of time. (2) The probe is relatively fragile and thus unsuitable for use on the production line. (3) The probe has a volume. When the probe is used to check a tiny motor, the position errors resulting from the volume of the probe would cause an unacceptable checking error to the checking result. (4) It is necessary to remove the core of the stator before the checking. Therefore, the measured result is not the real air-gap magnetic density distribution of the motor under the normal operations. Accordingly, it is unable to perform a precise analysis to the operation property of the motor based on the measured result.

In addition, the quality of the permanent magnet within a permanent magnet motor could be also determined by the back electromotive force of the winding. An advantage of such testing method is that the measured result could faithfully reflect the contribution of the permanent magnet to the magnetic path and the magnetic field of the motor during the operation of the motor. Therefore, it is possible to precisely analyze the operation property of the electric machinery based on the measure result. There exists no position issue between the sensor and the permanent magnet of the rotor. The testing result is extremely precise. Nevertheless, such testing method has two demands: (1) the rotor must be rotating; and (2) no driving current flows in the motor winding.

As above mentioned, a driving equipment is required for driving the rotor of the motor to be test the voltage of the winding of the stator i.e. the back electromotive force is obtained when the rotor driven by driving equipment. Please refer to FIG. 2, which shows the drawing that a driving equipment is applied for driving the rotor of the motor to be tested in order to measure the back electromotive force of the motor in the prior art. As shown in FIG. 2, the driving equipment includes the driving device 22 electrically connected to the driving circuit 21 to drive the rotor 23 via coupling portion 25, and then the back electromotive force of the motor is obtained by the detector 24. Nevertheless, the existence of the driving device 22 makes the testing system complex. In addition, it further takes lots of time to match the driving rotor of the driving device 22 with the rotor need to be tested (referring to the coupling portion 25 in FIG. 2). Therefore, the mentioned testing method is not suitable for use in the mass production either.

As above-mentioned, in order to optimize the method for testing the back electromotive force of the motor in the prior art and remove the driving device 22 in FIG. 2, a new method and circuit for testing the motor is necessary. An object of the present application is to provide a method and circuit with the higher preciseness, less checking time, more convenience and simpleness based on the measuring and analysis of the back electromotive force of the tested motor.

SUMMARY OF THE INVENTION

In accordance with an aspect of the present invention, the method and circuit with the higher preciseness, less checking time, more convenience and simpleness based on the measurement and analysis of the back electromotive force of the tested motor are provided.

Firstly, the motor is started by its winding. In such case, the winding is a driving element. Since there exists a driving current in the winding, it is unable to measure the back electromotive force. When the rotor is rotating at a predetermined speed, the external power of the winding is ceased. Then, the rotor would lose the driving torsion and rotate under the inertia. At this moment, the winding is served as a sensor element. The back electromotive force could be obtained by measuring the terminal voltages of the winding.

Please refer to FIGS. 3(A) and 3(B), which show the voltage and current waves of the winding during the testing process. FIG. 3(B) is the magnification of the rectangular selection portion in FIG. 3(A).

As shown in FIGS. 3(A) and 3(B), it is known there are three stages in the testing process. (S1) The motor is stared by its winding, and at this moment, the terminal voltage of the winding is the applied external voltage. There exists a driving current in the winding. Nevertheless, when the rotor is rotating at a predetermined speed higher than the necessary testing speed, the external power to the winding is ceased. The current within the winding would decline to zero after a period of time. (S2) In this stage, there is no current in the winding and the winding has no driving torsion. The rotor would keep rotating due to the inertia. Since there is no driving current within the winding, the terminal voltage of the winding is the back electromotive force. Therefore, the back electromotive force could be obtained by measuring the terminal voltage of the winding. (S3) After measuring the terminal voltage of the winding, it is practical to quickly stop the rotor by the winding. Such operation could save the testing time. It is to be noted that this operation is not essential for the testing method.

It is deserved to mention that when the motor loses the driving torsion and rotates under the inertia, the rotating speed of the rotor is still reducing due to the friction torsion. Such situation is especially apparent in the motor having a load therein, such as the cooling fan motor. For a motor having a load therein, during the testing process, since the load always exists, the rotating speed of the rotor would reduce apparently after the driving torsion is removed. Furthermore, since the back electromotive force has a direct ratio with the rotating speed of the rotator, the back electromotive force would reduce apparently with the reduction of the rotating speed of the rotor. Please refer to FIG. 4, which is a diagram showing waves of the back electromotive force in FIGS. 3(A) and 3(B) and the back electromotive force after the compensation.

In FIG. 4, the curve 1 represents the measured back electromotive force, and Pi (i=1, 2, 3, . . . ) represents the time of each half-period of the back electromotive force. As shown in FIG. 4, the back electromotive force would decline with the time, but Pi increases with the time. Since such measuring result does not correspond to the same rotating speed, it is unable to directly determine the qualified magnification based thereon. Therefore, a solution provided in the present application is to correct the measured back electromotive force result.

If it is able to obtain the rotating speed of each moment during the testing process, it is possible to correct all the respective measured back electromotive forces to the corresponding back electromotive forces for a same rotating speed. Since the back electromotive force has a direct ratio with the rotating speed, a corrected back electromotive force could be obtained based on the angle of the rotor, the rotating speed and the measured back electromotive force. For example, when the angle of the rotor is β, the rotating speed is ω, and the measured electromotive force is e, the corrected back electromotive force $e_m$ for a unified rotating speed $\omega_0$ could be obtained from the following equation.

$$e_m = e\frac{\omega_0}{\omega}$$

Certainly, the time axis should also be corrected for the unified rotating speed $\omega_0$. Taking a time increment Δt at the moment t, wherein the angle of the rotor rotating is Δβ, then, the following equation could be obtained.

$$\Delta\beta=\omega\Delta t$$

If the rotating speed of the rotor is $\omega_0$, the time $\Delta t_m$ taken to rotate the rotor Δβ angles would be obtained in following equation.

$$\Delta t_m = \frac{\omega}{\omega_0}\Delta t$$

If the sum of rotating angle of the motor from the initial time $t_0$ to time t is B, then the time $t_m$ for the motor to rotate from $t_0$ to have a sum rotating angle B under the rotating speed $\omega_0$ could be obtained from the following equation.

$$t_m = \int_0^t \frac{\omega}{\omega_0} dt + t_0$$

The back electromotive force wave II shown in FIG. 4 is the wave after the speed correction. As shown in FIG. 4, it is known the corrected back electromotive forces have corresponded to the same rotating speed.

The rotating speed of the motor reduces regularly. In the present application, the regulation of the speed-reduction of the motor is used to obtain the rotating speed of the rotor at a specific time by analyzing the corresponding measured back electromotive force. Taking the wave I shown in FIG. 4 as an example, the respective instantaneous rotating speed $\omega_i$ of the rotor at the individual middle point $t_i$ (i=1, 2, . . . ) of each half-period could be similarly obtained from the following equation.

$$\omega_i = \frac{\pi}{P_i},$$

wherein the corresponding instantaneous period is $2P_i$.

The change of the rotating speed of the motor is determined by the following equation, wherein the rotating inertia of the rotor is J and the load torsion is $T_L$.

$$J\frac{d\omega}{dt} = -T_L$$

Since the load of the motor is various, the regulation of the speed-reduction of the motor is various. It could be proved that, where there is no load on the motor, a relationship between the instantaneous period $2P_i$ and the time t has a linear increase, as show in FIG. 5. According to such a relationship, when some instantaneous periods $2P_{is}$ for various time $t_{is}$ are measured, it is possible to predict the other instantaneous period 2P and then the corresponding instantaneous rotating speed ω could be found via the following equation.

$$\omega = \frac{\pi}{P}$$

With regard to other load of the motor, the relationship between the instantaneous period $2P_i$ and the time t could be show as FIG. 6. When the load is accurately known, it is also possible to obtain the accurate relationship between the instantaneous period $2P_i$ and the time t. Nevertheless, in practice, it is difficult to know the accurate load sometimes. In some cases, the load would be various with the changing rotating speed. In such cases, it is difficult to obtain a clear relationship between the instantaneous period and the time. As mentioned above, it would be more efficient to use the interpolation to the known relationship as shown in FIG. 6 so as to obtain the instantaneous period and the corresponding rotating speed for a specific time within the relationship.

For the motor having the rotor with great inertia and small load, since the measured rotating speed reduction is no apparent, it is practical to omit the correcting step to the measured result.

It is possible to determine whether the magnetization of the motor is qualified after comparing the corrected back electromotive force with the expected value of the back electromotive force. A characteristic of the corrected back electromotive force might be compared with a characteristic of the expected back electromotive force. Certainly, the corrected back electromotive force has many characteristics, so that it is possible to perform the comparisons for more than one characteristics. As those well-known to one skilled in the art, the reliability of the comparison results and the amount of the analysis data both would increase with the amount of the compared characteristics. If the selected characteristics are all within the relevant error scopes, as showing in the following equation (wherein $EG_i$, $EG_{bi}$ and $EG_{ti}$ are the measured value, the expected value and the allowable error of the $i^{th}$ characteristic), it is practical to determine that the measured back electromotive force is qualified, i.e. the permanent magnetization of the measured rotor is qualified.

$$|EG_i-EG_{bi}|<EG_{ti}\ i=1,2,\ldots n$$

Please refer to FIG. 7, which is a diagram showing the comparison between the wave of the measured and corrected back electromotive force and the wave of the expected back electromotive force. In FIG. 7, c2 is the wave of the measured and corrected back electromotive force, c1 is the wave of the expected back electromotive force, and $\Delta E_{max}$ is the maximum error of the selected characteristic. Please refer to FIG. 8, which is a diagram showing the comparisons of the harmonic wave weight amplitudes of the measured and corrected back electromotive force and the expected back electromotive force in FIG. 7. In FIG. 8, $A_i$, $A_{bi}$ and $\Delta A_i$ (i=1, 2, . . . ) are the measured value, the expected value and the error of the respective harmonic wave weight amplitude, and the respective selected characteristic represents the respective $A_i$. Finally, the allowable tolerances for the error scopes could be determined by the relevant operating experiences, theorems or the analysis of the statistics of measurements of the qualified rotors. The allowable error is used for the consideration of the dispersity between the measurement and the magnetization. Such dispersity could be obtained by the statistics of the measurements. A common method includes the following steps of: 1. providing some qualified rotors, 2. measuring the back electromotive forces of the qualified rotors, 3. statistically analyzing the measurements of the back electromotive forces, 4. gathering the statistics of the respective expected value $EG_{bi}$ and variance $\delta_i$ of the selected characteristics. Then the respective allowable error $EG_{ti}$ could be defined as $k\delta_i$, wherein k is a factor. The testing precision of the back electromotive force is controlled by the selection of the factor k. The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
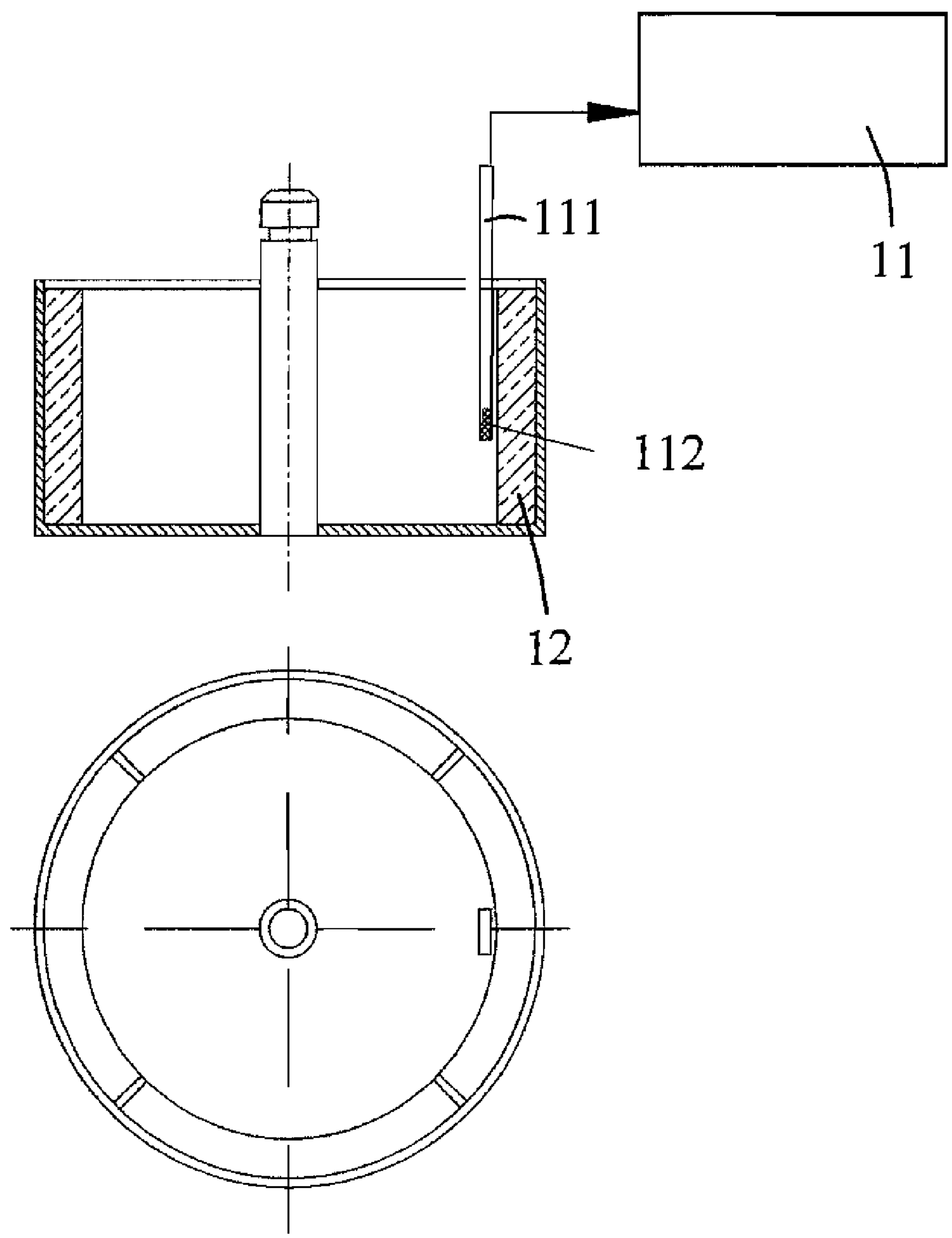
FIG. 1 is a drawing showing that the magnetic analyzer is used to check the permanent magnet of the motor in the prior art.
Figure 2:
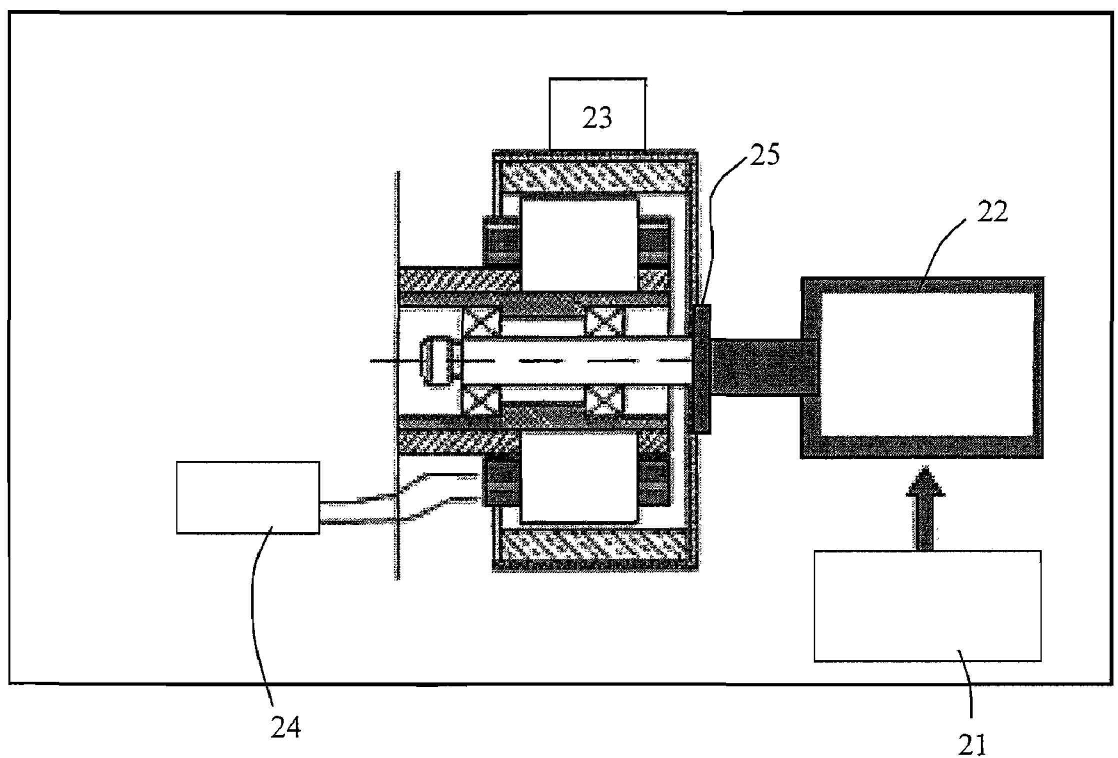
FIG. 2 shows the drawing that a driving equipment for driving the rotor of the motor to be checked is applied in order to measure the back electromotive force of the motor in the prior art.
Figure 3:
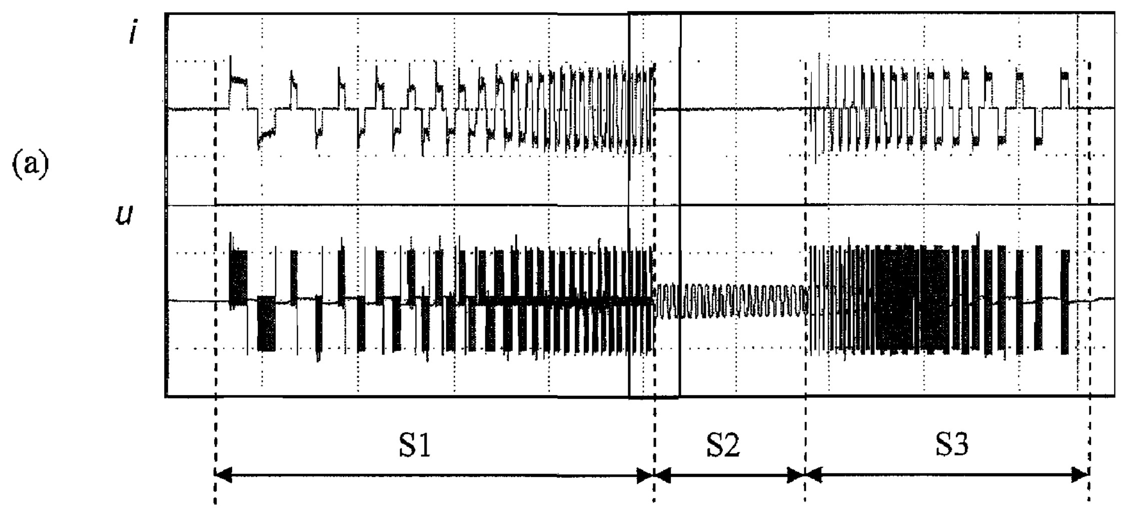
FIGS. 3(A) and 3(B) show the voltage and current waves of the winding during the testing process.
Figure 3:
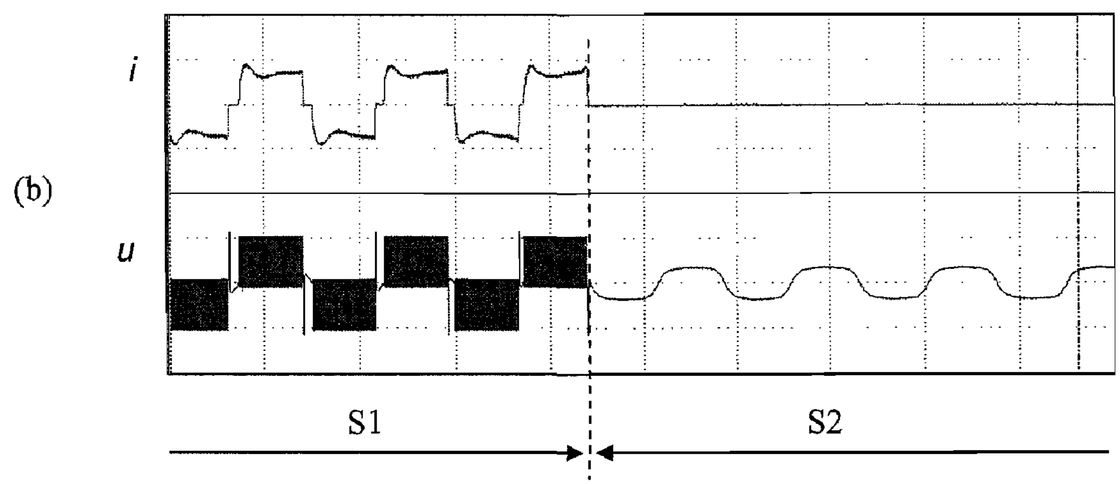
Figure 4:
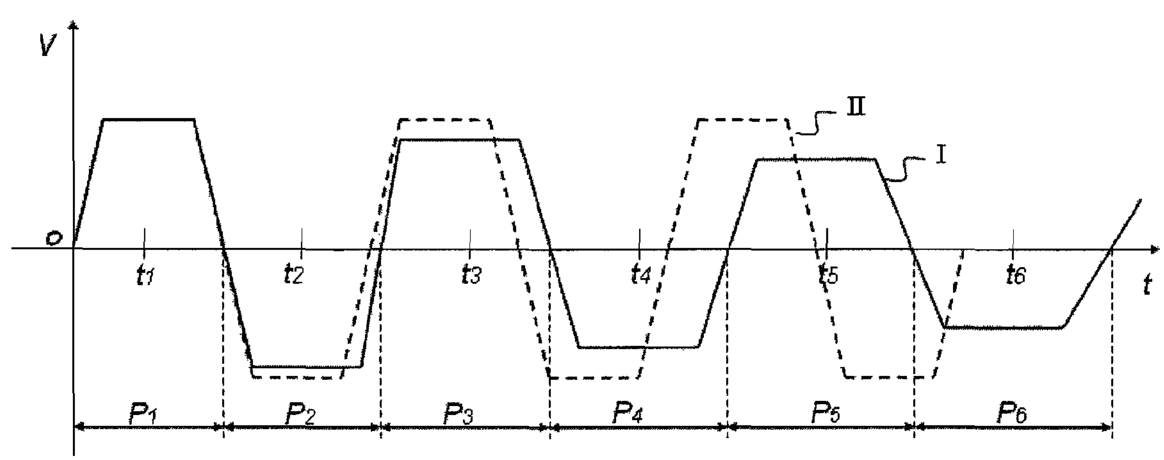
FIG. 4 is a diagram showing waves of the back electromotive force in FIGS. 3(A) and 3(B) and the back electromotive force after the compensation.
Figure 5:
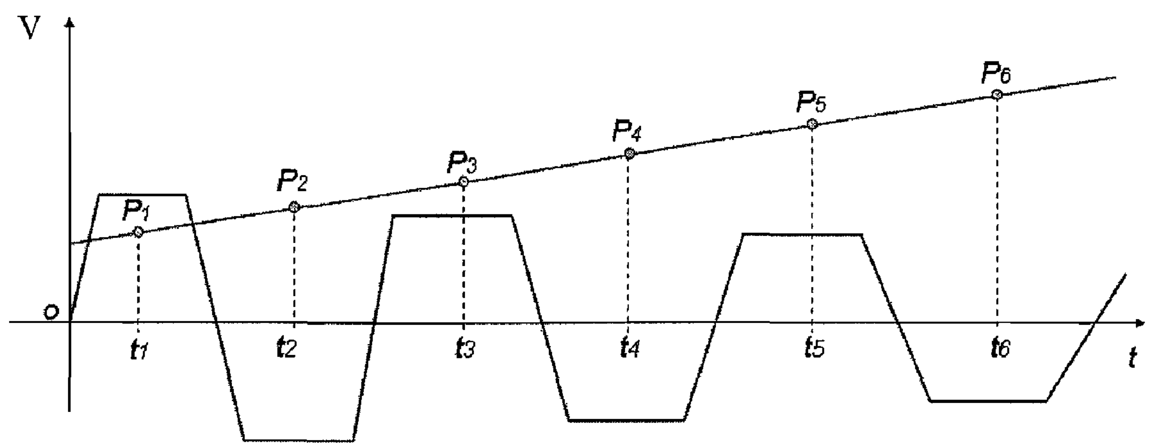
FIG. 5 shows the relationship between the instantaneous period $2P_i$ and the time t where there is no load on the motor.
Figure 6:
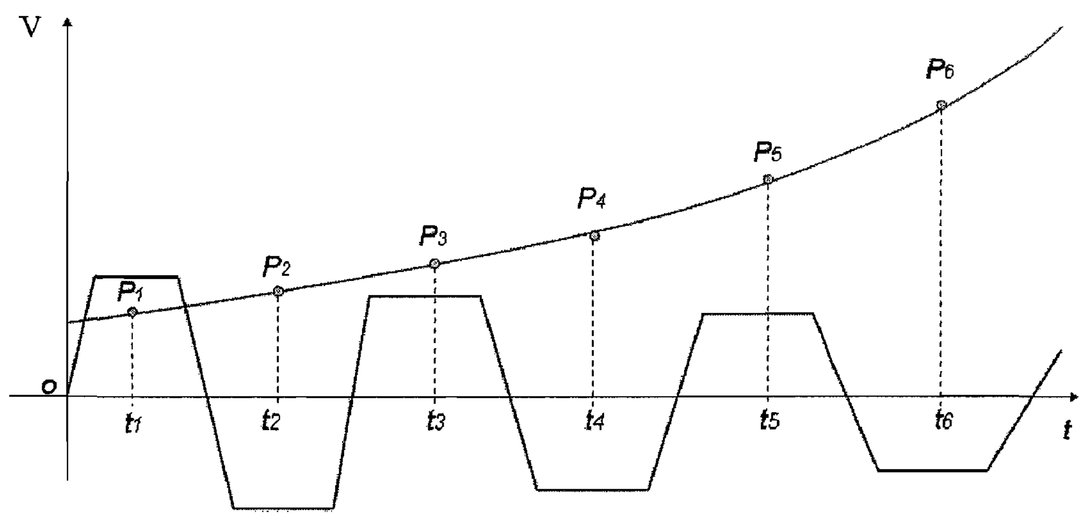
FIG. 6 shows the relationship between the instantaneous period $2P_i$ and the time t when a specific load is applied.
Figure 7:
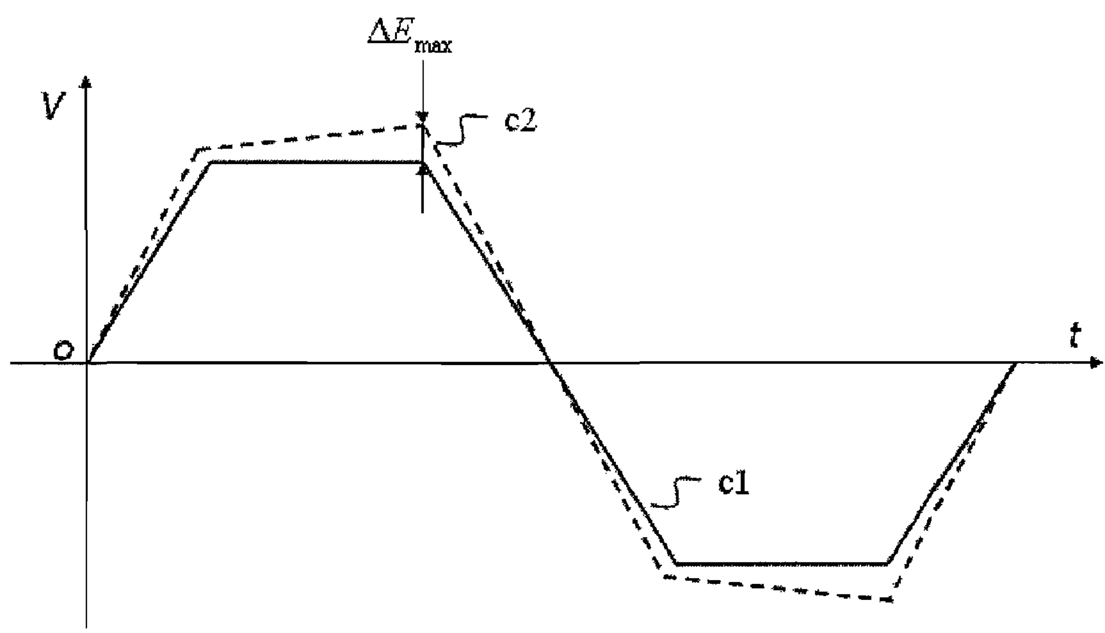
FIG. 7 is a diagram showing the comparison between the wave of the measured and corrected back electromotive force and the wave of the expected back electromotive force.
Figure 8:
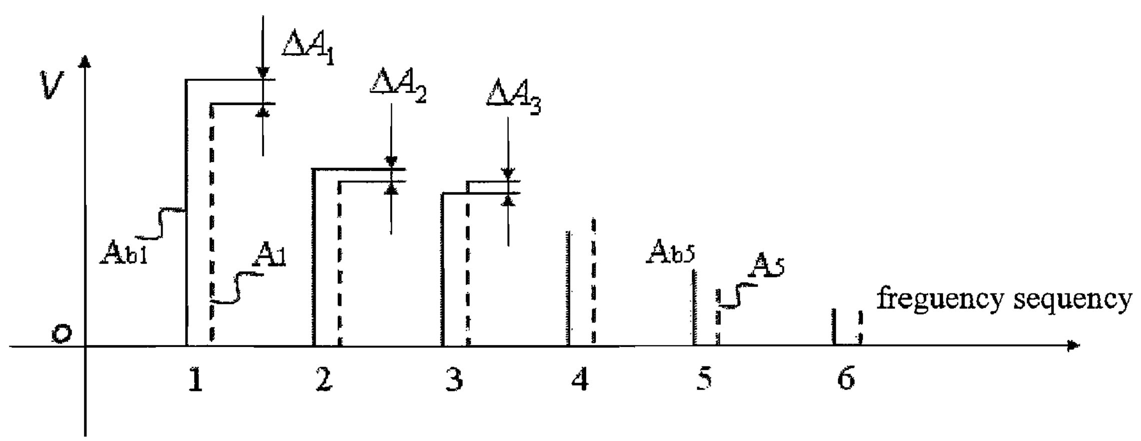
FIG. 8 is a diagram showing the comparisons of the harmonic wave weight amplitudes of the measured and corrected back electromotive force and the expected back electromotive force in FIG. 7.
Figure 9:
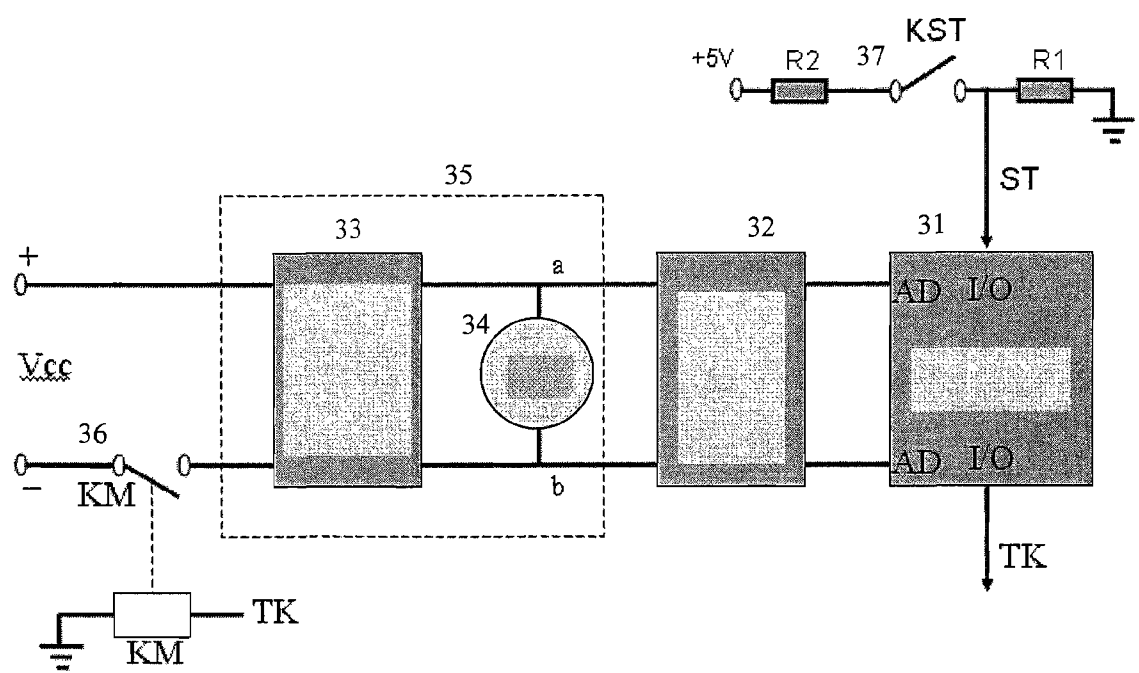
FIG. 9 is a circuit diagram showing the use of the provided method to the single-phase brushless direct current motor according to a preferred embodiment of the present application.

Please refer to FIG. 9, which is a circuit diagram showing the use of the provided method to the single-phase brushless direct current motor according to a preferred embodiment of the present application. The main testing circuit includes the digital controlling device 31 and the signal processing circuit 32. In addition, the start key 37, the relay 36, the power source Vcc, the motor 35 having the driving circuit 33 and the motor winding 34, and other components (such as the resistors R1 and R2) are also shown in FIG. 9.

As shown in FIG. 9, the digital controlling device 31 is used to control, sample the back electromotive force and process the signal. The signal processing circuit 32 is used to modify the signal of the back electromotive force. The digital controlling device 31 sends a control signal TK to turn-on or turn-off the relay 36. Before performing the testing method of the present application, the start key 37 is in a normal condition, and the start signal ST is in a relatively lower potential level.

When the start key 37 is pressed for performing the method of the present application, the start signal ST would have a relatively higher potential level. After receiving the start signal ST with higher potential level, the digital controlling device 31 sends turn-on signal TK to close the contact of the relay 36 so as to provide the current to the driving circuit 33 to drive the rotor to be tested.

After the digital controller 31 operates for a proper period, the contact of the relay 35 is turn-off and then the driving circuit 33 would not supply power to the motor. The period is determined by a timer to ensure that the rotor of the motor has reached a specific rotating speed for sampling the back electromotive force signal latter. At this moment, the winding 34 would have no external current and then be in the freewheeling status.

The digital controlling device 31 delays for a second proper period which is determined by the timer to ensure the current within the winding 34 has reduced to zero, and then the digital controlling device 31 starts the analog to digital (A/D) transform for sampling the adjusted back electromotive force signals. After obtaining enough sampling data, the digital controlling device 31 stops the analog to digital (A/D) transform and then modify the sampled BEMF corresponding to the decreasing rotating speed. Comparing the modified BEMF with the predetermined expected back electromotive force and amount of allowable error, the digital controlling device 31 determines whether the back electromotive force of the tested rotor is qualified, i.e. the digital controller 31 determines whether the permanent magnetization of the motor is qualified.

Figure 10:
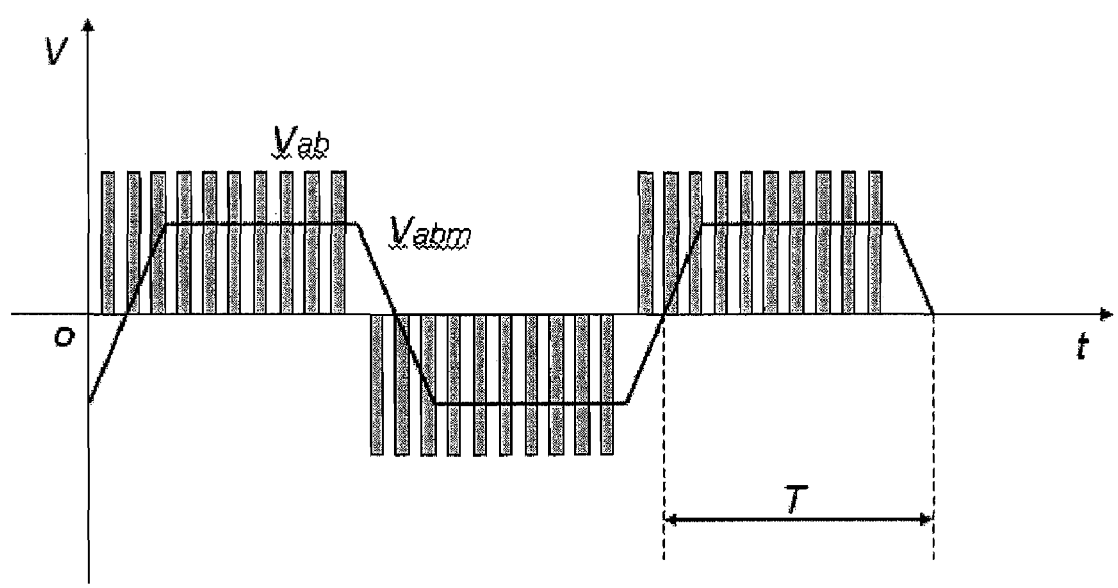
FIG. 10 is a diagram showing the terminal voltages of the winding and the relevant filter wave during the starting process.

As above, the time delay technology of the timer is used to ensure the rotor has been accelerated to a specific speed. Nevertheless, during the starting process, since the terminal voltages of the winding 34 reflect the rotating speed of the motor, it is practical to sample the terminal voltages of the winding 34 via the digital controlling device 31 to test whether the rotor of the motor has reached the desired rotating speed. Please refer to FIG. 10, which is a diagram showing the terminal voltages of the winding and the relevant filter wave during the starting process. In FIG. 10, Vab is the sampled voltage signal of the winding. Since the general motor controller applies a pulse width modulation (PWM) soft-start technology, the sampled voltage signals are also the pulse signals. The digital controlling device 31 performs a digital filtering to the PWM wave and the filtered wave is Vabm. Based on the over-zero point of the Vabm, it is possible to obtain the period 2T of the motor, and then it is possible to determine whether the rotating speed of the motor has reached the desired speed accordingly. In addition, it is usual to exist a phase delay between the filtered voltage signal Vabm and the original sampled signal Vab. Nevertheless, the time for such a phase delay is usually short and the system is not so critical to the real-time property, such delay could be omitted.

Figure 11:
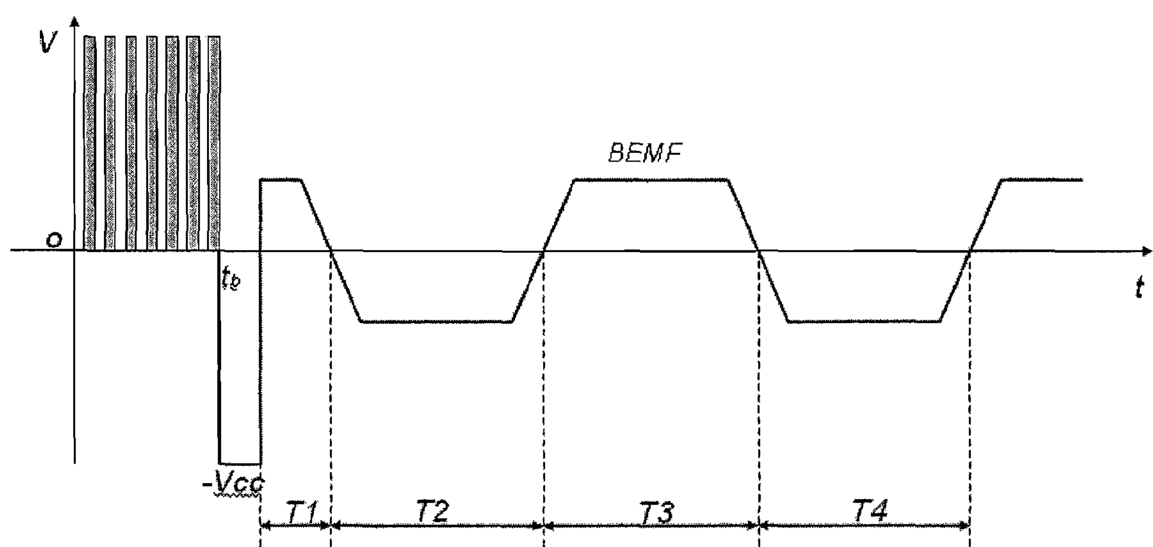
FIG. 11 is the diagram showing the wave of the terminal voltages of winding during the starting process of the motor.

Since the back electromotive force has an apparent regulation, it is possible to determine whether the current within the winding 34 is zero by measuring the terminal voltages of the winding 34 after turning off the relay 36 via the digital controlling device 31. Please refer to FIG. 11, which is the diagram showing the wave of the terminal voltages of winding during the starting process of the motor. In FIG. 11, the digital controlling device 31 turns off the relay 36 to turn off the power Vcc and the winding 34 at the moment $t_b$. Then, the winding 34 operates under the freewheeling status. The time intervals between the over-zero points of the terminal voltages of winding 34 are recorded from the moment $t_b$. When the following relationships are achieved, wherein s is a positive integral, it is able to determine the current within the winding 34 is zero. It is to be noted that when the s increases, the requirement becomes stricter, but, in general, s is 1 or 2.

$$T_i \approx T_{i-1} \approx T_{i-2} \ldots \approx T_{i-s} \text{ and}$$

$$T_i \geqq T_{i-1} \geqq T_{i-2} \ldots \geqq T_{i-s}$$

Figure 12:
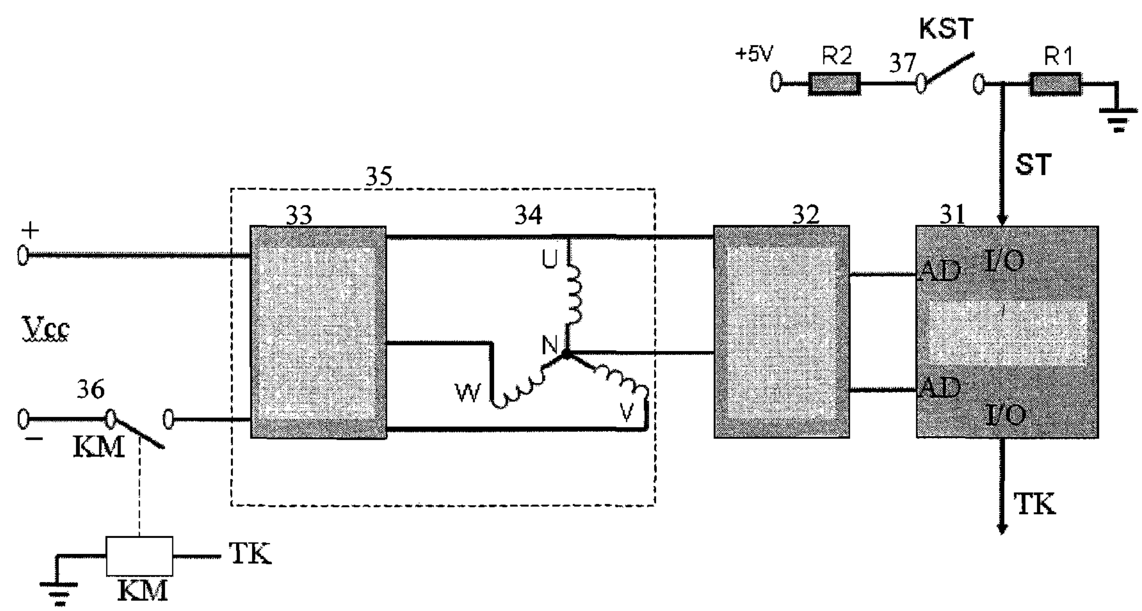
FIG. 12 is a circuit diagram showing the use of the provided method to the three-phase permanent magnetic motor according to a preferred embodiment of the present application.

Please refer to FIG. 12, which is a circuit diagram showing the use of the provided method to the three-phase permanent magnetic motor according to a preferred embodiment of the present application. As shown in FIG. 12, the motor 35 includes the three-phase winding 34 and the three-phase driving circuit 33, and the other components are the same as those in FIG. 9. In the three-phase motor 35, the three phase windings U, V and W are connected as a star, the signal processing circuit 32 is connected electrically to the winding U and the neutral point N. Therefore, the back electromotive force received by the digital controlling device 31 is that of the winding U. The other control methods are the same as those for FIG. 9 and are omitted herein.

Figure 13:
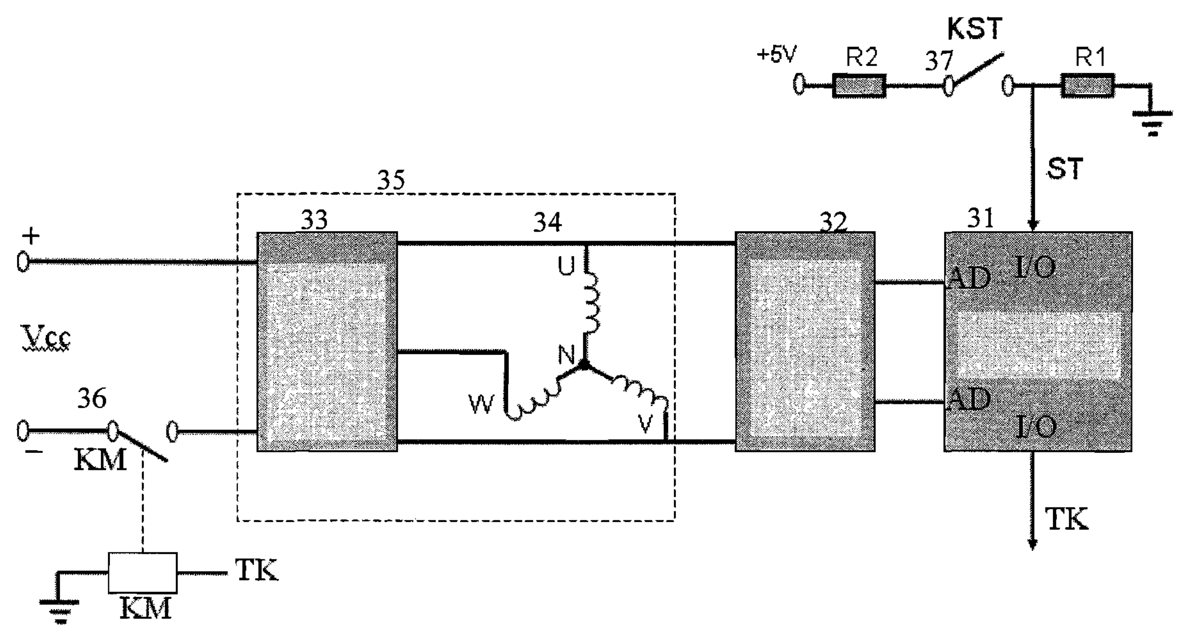
FIG. 13, which is a circuit diagram showing the use of the provided method to the three-phase permanent magnetic motor according to another preferred embodiment of the present application.

Please refer to FIG. 13, which is a circuit diagram showing the use of the provided method to the three-phase permanent magnetic motor according to another preferred embodiment of the present application. The difference between FIG. 12 and FIG. 13 is that the signal processing circuit 32 is connected electrically to the windings U and V in FIG. 13. Therefore, what received by the digital controlling device 31 is the linear back electromotive force of the windings. The other control methods are the same as those for FIG. 9 and are omitted herein.

Figure 14:
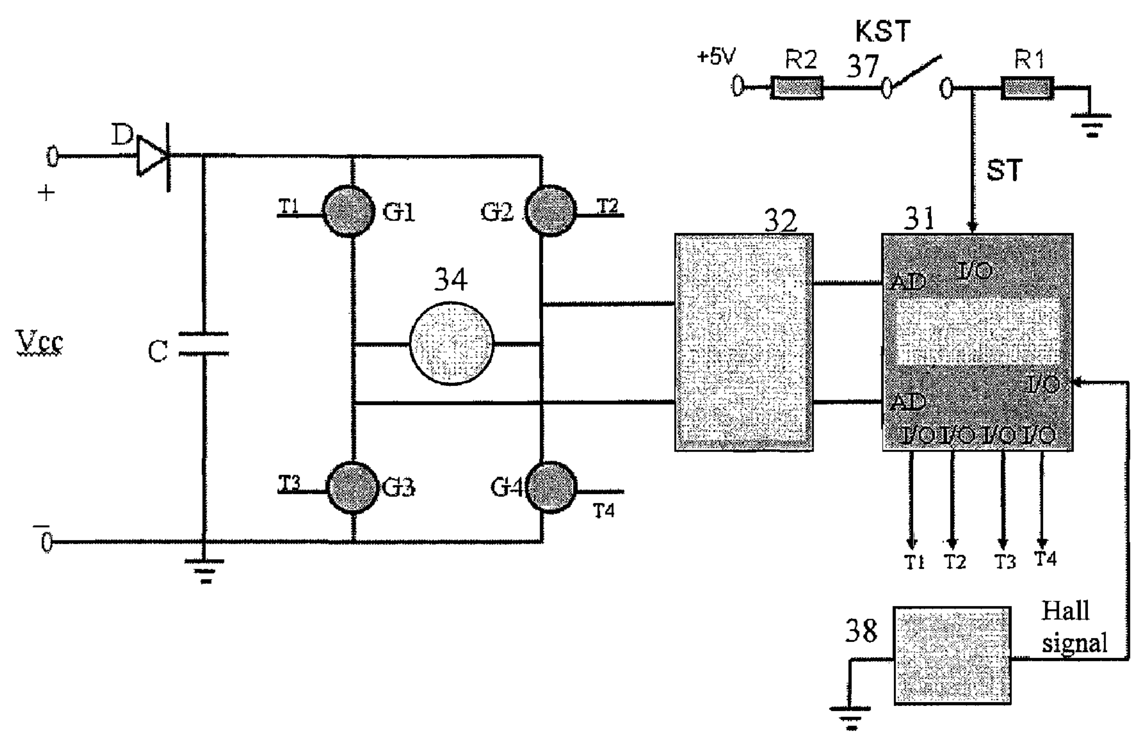
FIG. 14 is a circuit diagram showing the use of the provided method to the single-phase brushless direct current motor according to a preferred embodiment of the present application.

Please refer to FIG. 14, which is a circuit diagram showing the use of the provided method to the single-phase brushless direct current motor according to a preferred embodiment of the present application. The difference between FIG. 14 and the aforesaid embodiments is that plural switches (such as transistors) G1-G4 are used to replace the relay 36 and the driving circuit 33, and a Hall sensor 38 is provided to obtain the location information of the motor rotor in FIG. 14.

During the operation, the digital controlling device 31 sends control signals T1, T2, T3 and T4 to the switches G1, G2, G3 and G4 based on the location information transmitted from Hall sensor 38 so as to control the operating status of the motor. When the start key 37 is pressed, the digital controlling device 31 would send the corresponding control signals to the switches based on the location of the rotor and then apply the driving voltage to the winding 34. Then the rotating speed of the rotor would increase, and the digital controlling device 31 determines whether the rotating speed of the rotor has achieved a desired value by the location signal from the Hall sensor 38. When the rotating speed of the rotor has achieved the desired value, the digital controlling device 31 turns off the switches G1-G4. Then, the digital controlling device 31 samples the information about the back electromotive force of the winding 34, performs the follow-up compensation, analysis and comparisons of the sampled back electromotive force.

The mentioned embodiments are used for describing the present application but not limited to the circuit structures of the present application. In practice, various applications relating to the controlling device 31 and the signal processing circuit 32 of the present application are still within the spirit and scope of the appended claims. In order to further realize the present application, please refer to FIG. 15, which is the flow chart for the testing method according to a preferred embodiment of the present application.

Figure 15:
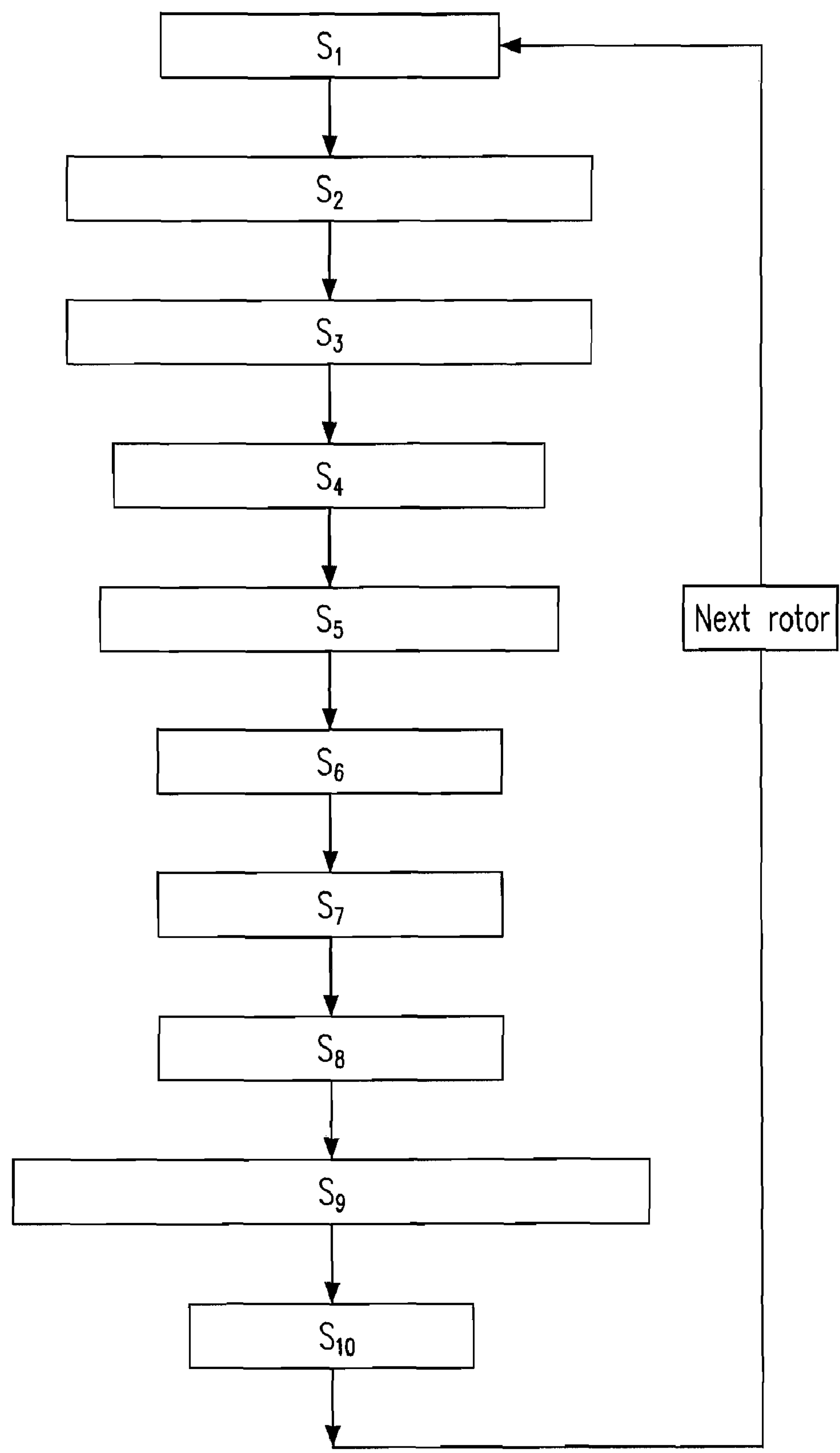
FIG. 15 is the flow chart for the testing method according to a preferred embodiment of the present application.

In FIG. 15, S1 represents the step of pressing the start key, S2 represents the step of providing the current to the winding to rotate the rotor from the power source, S3 represents the step of waiting until the rotating speed of the rotor reaches a threshold value, S4 represents the step of stopping the provision of the current to the winding after the rotating speed of the rotator reaches the threshold value, S5 represents the step of waiting until the current within the winding reduced to zero, S6 represents the step of measuring the terminal voltages of the winding while the rotor freewheeling and then a back electromotive force is obtained, S7 represents the step of obtaining a compensated back electromotive force by at least a performance value of the rotor during the measuring of the terminal voltages of the rotor, S8 represents the step of analyzing the compensated back electromotive force and selecting at least a characteristic of the compensated back electromotive force, S9 represents the step of comparing the at least a characteristic of the compensated back electromotive force with the corresponding characteristic of the expected back electromotive force to obtain a result, and S10 represents the step of outputting the result to determine whether the magnetization of the motor is qualified, and then the mentioned steps are performed to the next rotor.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for testing a motor having a rotor and a winding, comprising steps of:

(a) providing a current to the winding to rotate the rotor;

(b) stopping the current while a rotating speed of the rotor reaches a predetermined speed;

(c) measuring a terminal voltage of the winding while no current is within the winding;

(d) obtaining a compensated back electromotive force of the winding by compensating the terminal voltage with a performance of the rotor, wherein the performance includes an instantaneous period and a rotating speed of the rotor, and the step (d) is performed by computing the instantaneous period and the rotating speed of the rotor and then modifying the terminal voltage to a target rotating speed to thereby obtain the compensated back electromotive force due to a reduction of the rotating speed;

(e) comparing the characteristic of the compensated back electromotive force with a predetermined parameter to understand a magnetization of the motor.

2. A method according to claim 1, wherein the motor is a single-phase brushless direct current motor.

3. A method according to claim 1, wherein the motor is one of a three-phase magnetic motor and a multi-phase magnetic motor.

4. A method according to claim 1, wherein the step (e) is performed by comparing the predetermined parameter corresponding to a desired back electromotive force with said characteristic of the compensated back electromotive force to obtain a comparison result and then checking whether the comparison result is within an error scope.

5. A method according to claim 4, wherein the characteristic is a magnitude of a respective harmonic wave of the back electromotive force.

6. A method according to claim 4, wherein the characteristic and the error scope are determined by at least one of an experience, a theorem and a statistic analysis.

7. A circuit for testing a motor having a rotor and a winding, comprising:

a controlling device receiving a start signal, providing a current to the winding to rotate the rotor, stopping a provision of the current while a rotating speed of the rotor reaches a predetermined value, measuring a terminal voltage of the winding while a current within the winding reaches zero, and obtaining a compensated back electromotive force in the winding by compensating the terminal voltage with a performance of the rotor, wherein the performance includes an instantaneous period and a rotating speed of the rotor, and the controlling device computes the instantaneous period and the rotating speed of the rotor and then modifies the terminal voltage corresponding to a target rotating speed to thereby obtain the compensated back electromotive force due to a reduction of the rotating speed; and a processing device processing a voltage signal of the winding and electrically connected with the controlling device and the motor, wherein the controlling device compares the characteristic of said compensated back electromotive force with a predetermined parameter to understand a magnetization of the motor.

8. A circuit according to claim 7, wherein the motor is a single-phase brushless direct current motor.

9. A circuit according to claim 7, wherein the motor is one of a three-phase magnetic motor and a multi-phase magnetic motor.

10. A circuit according to claim 7, wherein the controlling device is electrically connected to a relay and controls a connection of the relay so as to drive the current to the winding based on the start signal.

11. A circuit according to claim 7, wherein the controlling device is electrically connected to a switch and controls a connection of the switch so as to drive the current to the winding based on the start signal.

12. A circuit according to claim 7, wherein the controlling device determines whether the rotating speed of the rotor reaches the predetermined speed by a time delay.

13. A circuit according to claim 7, wherein the controlling device determines whether the rotating speed of the rotor reaches the predetermined speed by sampling the terminal voltage of the winding.

14. A circuit according to claim 7, wherein the controlling device is electrically connected to a Hall sensor and determines whether the rotating speed of the rotor reaches the predetermined speed by the Hall sensor.

15. A method according to claim 7, wherein the performance includes instantaneous period and rotating speed of the rotor.

16. A method for testing a motor having a rotor and a winding, comprising steps of:

(a) providing a power to rotate the rotor to a predetermined speed;

(b) removing the power;

(c) measuring a terminal voltage of the winding while the current within the winding is zero;

(d) obtaining a back electromotive force in the winding by compensating the terminal voltage with a performance of the rotor, wherein the performance includes an instantaneous period and a rotating speed of the rotor, and the step (d) is performed by computing the instantaneous period and the rotating speed of the rotor and then modifying the terminal voltage to a target rotating speed to thereby obtain the compensated back electromotive force due to a reduction of the rotating speed;

(e) selecting a characteristic of the compensated back electromotive force; and (f) determining a magnetization of the motor by comparing the characteristic with a predetermined parameter.

17. A method according to claim 16 wherein the motor is one selected from a group consisting of a single-phase brushless direct current motor, a three-phase permanent magnet motor and a multi-phase permanent magnet motor.

* * * * *

UNITED STATES PATENT AND TRADEMARK OFFICE

CERTIFICATE OF CORRECTION

PATENT NO. : 7,852,027 B2
APPLICATION NO. : 11/755299
DATED : December 14, 2010
INVENTOR(S) : Wu et al.

It is certified that error appears in the above-identified patent and that said Letters Patent is hereby corrected as shown below:

Title Page, Item "(75) Inventors:"

Please delete "Jian-Ping Yang" and insert therefor --Jian-Ping Ying--.

Signed and Sealed this
Twelfth Day of February, 2013

Teresa Stanek Rea
*Acting Director of the United States Patent and Trademark Office*